A. B. NORWALK.
MOTOR VEHICLE.
APPLICATION FILED MAY 25, 1917.
1,317,814.
Patented Oct. 7, 1919.
3 SHEETS—SHEET 1.
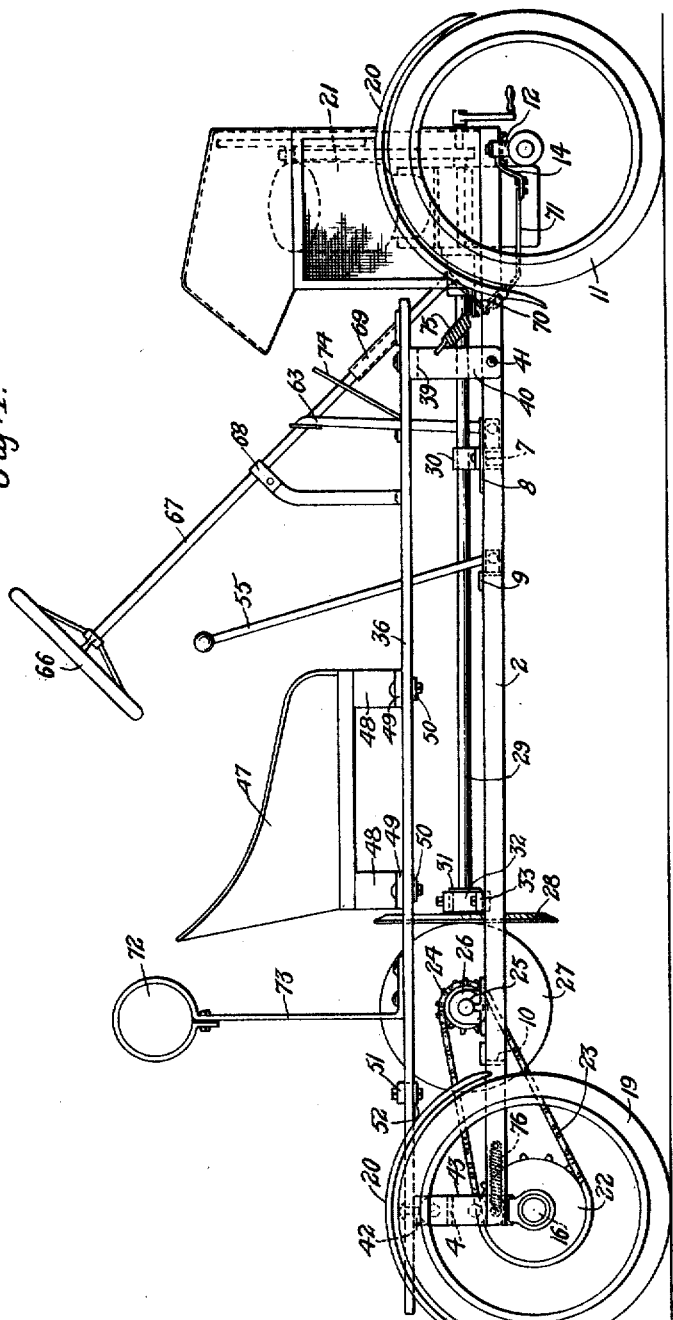

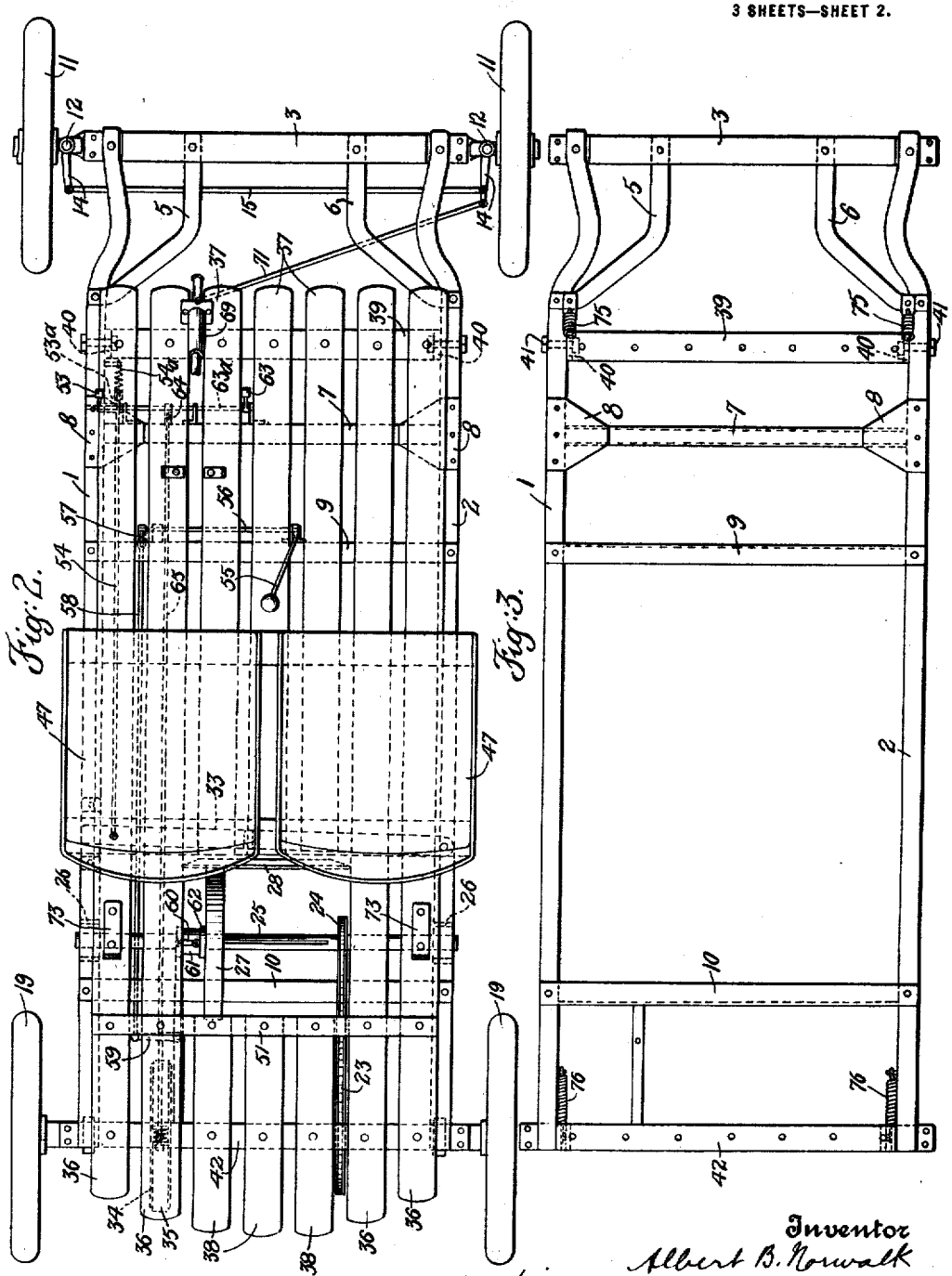

A. B. NORWALK.
MOTOR VEHICLE.
APPLICATION FILED MAY 25, 1917.
1,317,814.
Patented Oct. 7, 1919.
3 SHEETS—SHEET 3.
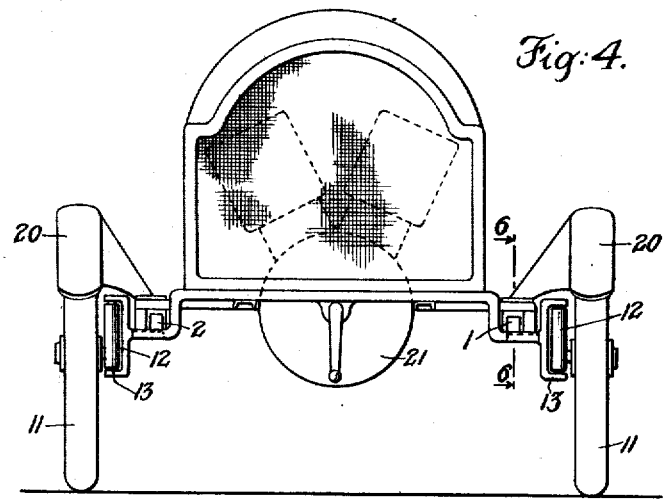
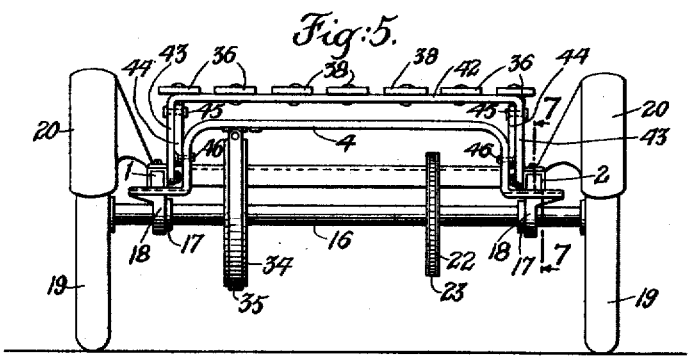
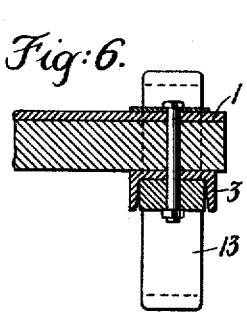
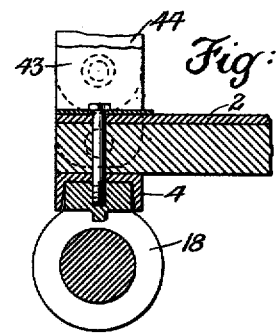
Inventor
Albert B. Norwalk
By his Attorney
Henry T. Williams

UNITED STATES PATENT OFFICE.

ALBERT B. NORWALK, OF NEW YORK, N. Y.

MOTOR-VEHICLE.

1,317,814.   Specification of Letters Patent.   Patented Oct. 7, 1919.

Application filed May 25, 1917. Serial No. 170,799.

*To all whom it may concern:*

Be it known that I, ALBERT B. NORWALK, a citizen of the United States, residing at the borough of Manhattan, city of New York, in the county of New York and State of New York, have invented certain new and useful Improvements in Motor-Vehicles, of which the following is a specification, reference being had therein to the accompanying drawings, forming part thereof.

My invention relates to motor vehicles such as motor cars or automobiles, and the object of my invention is to produce a practical, dependable and serviceable motor car which can be sold at a very low price, and in this connection other objects of my invention are inexpensiveness of manufacture, simplicity of construction, strength, durability, reliability, comfort in use, and other objects and advantages which will hereinafter appear.

My invention includes the mounting of a superstructure including a seat-carrying resilient platform, such for example, as a buckboard platform, upon a chassis which includes a comparatively rigid running-gear frame, and my invention further includes supporting means for the resilient platform adapted to permit the free resilient action thereof, such supporting means more particularly including pivotal connections between the ends of the superposed resilient platform and the underlying chassis frame and such connections also providing for the free longitudinal movement of the ends of the resilient platform relatively to each other while preventing the free longitudinal movement of such platform as a whole relatively to the supporting frame of the chassis. My invention also includes springs tending to raise the middle of the buckboard platform for preventing any permanent downwardly bent condition or set in the boards which form the resilient platform. My invention also includes various features of construction and combinations of parts as will appear from the following description.

I shall now describe the motor car embodying my invention illustrated in the accompanying drawings and shall thereafter point out my invention in claims.

Figure 1 is a side elevation of a motor car embodying my invention.

Fig. 2 is a plan view of the same with the engine, its hood, the footboard, the steering wheel, the fuel tank and other parts omitted.

Fig. 3 is a plan view of the chassis frame together with the buckboard cross-bars and supports.

Fig. 4 is a front elevation as seen from the right in Fig. 1.

Fig. 5 is a similar view from the rear as viewed from the left in Fig. 1, with parts omitted.

Fig. 6 is an enlarged vertical section on a plane indicated by the line 6—6 of Fig. 4 as viewed from the left.

Fig. 7 is a similar view on a vertical plane indicated by the line 7—7 of Fig. 5 as viewed from the right.

The motor vehicle illustrated in the accompanying drawings has a chassis and a buckboard superstructure combined therewith in accordance with my invention. The chassis includes a comparatively rigid steel frame shown as having side bars 1 and 2, a front axle member 3 connecting the front ends of the side bars 1 and 2 and shown as slightly raised or offset upwardly in its middle part, a rear axle member 4 connecting the rear ends of the side bars 1 and 2 and offset upwardly in its middle part, bent engine-supporting braces 5 and 6 extending angularly between the front axle member 3 and the side bar 1 at the left of the machine and the front axle member 3 and the side bar 2 at the right respectively, a forward cross-beam 7, angle-plate braces 8 therefor, and an intermediate cross-beam 9 and a rear cross-beam 10 both extending transversely between the side bars 1 and 2. The side bars 1 and 2 of the chassis frame are shown as of channel shape and are preferably provided with wood fillers, as appears in Figs. 6 and 7 of the drawings. The front and rear axle members 3 and 4 are also shown as of channel form. The front cross-beam 7 may be a channel and the other cross-beams 9 and 10 may be of angle shape, as indicated in Fig. 3.

Front wheels 11 are mounted upon steering knuckles 12 which are pivoted in a usual way in bifurcated axle stubs 13 secured to and forming end extensions of the front axle member 3. The steering knuckles 12 are provided with usual rearwardly extending steering arms 14 which are connected together in the usual way by a steering link 15. At the rear of the machine an axle shaft or driving shaft 16 is journaled in bearings 17 carried by castings 18 which are secured to the horizontally extended ends of the rear axle member 4, as appears more particularly in Figs. 5 and 7 of the drawings. The driving shaft 16 at its projecting ends carries rear wheels 19, at least one of which is a driving wheel rotating with the drive shaft 16, but preferably one of the rear wheels 19 is loosely mounted to rotate relatively to the drive shaft 16, to facilitate turning and also to reduce the liability of skidding, it having been found that one of the wheels 19 is ample for traction purposes. Mud guards or fenders 20 carried by the chassis frame, including the side bars 1 and 2, are shown as provided for the ground wheels or vehicle wheels 11 and 19.

An internal combustion engine 21, preferably of the V type, as indicated in Figs. 1 and 4 of the drawings, is mounted upon the front end of the frame adjacent to the front axle member 3 and has, as appears in the drawings, a crank-chamber projecting somewhat below and cylinders projecting above the front axle member 3 and adjacent frame parts, including the engine-supporting braces 5 and 6 and the side bars 1 and 2. The transmission mechanism between the engine 21 and the drive shaft 16 includes a sprocket wheel 22 fixed upon the drive shaft 16 and connected by a sprocket chain 23 with a sprocket pinion 24 fixed upon a transverse jack-shaft or countershaft 25 journaled in bearings 26 on the side bars 1 and 2. A friction wheel 27 is splined upon the jackshaft 25 to be moved longitudinally thereof and to rotate therewith. A friction disk 28 is adapted to engage the periphery of the friction wheel 27 and is fixed upon the rear end of a longitudinally extending transmission shaft 29 which at its forward end has a splined connection with the crank shaft of the internal combustion engine 21 and which rearward from the engine 21 is journaled in a bearing 30 on the forward cross-piece 7. At the rear end of the transmission shaft 29 the friction disk 28 is provided with a flanged boss 31 journaled in a bearing 32 carried by an operating lever or clutch lever 33, which is pivoted at one end upon the side bar 2 of the chassis frame, and at its other or free end is guided by a guide clip on the side bar 1, as appears in Fig. 2. A brake drum 34 is fixed upon the drive shaft 16 and is adapted to be gripped by a brake band 35 anchored to the rear axle member 4 (Fig. 5).

The buckboard superstructure comprises a buckboard platform spaced above the supporting chassis frame which includes the longitudinally extending side bars 1 and 2, and this buckboard platform includes longitudinally extending resilient slats or boards which are shown as laterally slightly spaced apart and of which there are full length boards or slats 36, shown as four in number, two at each side, medium length forward boards or slats 37 between the two pairs of full length boards 36 and shown as three in number, and three corresponding middle short boards or slats 38 at the rear, an opening in the platform being provided between the ends of the two sets of middle boards 37 and 38 for the reception of the upper edges of the transversely slidable friction wheel 27 and the friction disk 28, as appears in the drawings. At their forward ends the two pairs of full length boards 36 and the three intermediate forward boards 37 are all firmly secured to a connecting and supporting bar 39 which extends transversely and is shown as provided at its ends with rigid downwardly projecting platform-supporting lever arms 40, which in the construction illustrated in the drawings are shown as formed of one piece or integral with the cross-bar 39. The lower ends of the downwardly extending lever arms 40 are connected to the chassis frame side bars 1 and 2 by means of pivots 41, as shown in the drawings. The rear ends of the two pairs of lateral boards or full length boards 36 and the rear ends of the rear short boards 38 are all connected together by and firmly secured to a rear cross-bar 42, shown as provided at its ends with downwardly projecting lever arms 43, similar to the forward lever arms 40, and terminating adjacent to the respective side bars 1 and 2. Upright supporting links 44 are pivotally connected at their upper ends to the respective lever arms 43 adjacent to the bar 42 by means of pivot pins 45, and at their lower ends the supporting links 44 are similarly pivotally connected to the upright portions of the upwardly offset rear axle member 4 by means of pivot pins 46, as appears in the drawings, particularly in Fig. 5 thereof.

A pair of similar seats 47 are mounted side by side upon the buckboard platform, formed by the resilient boards or slats 36, 37 and 38, substantially midway between the transverse end bars 39 and 42, and the seats 47 are shown as supported by means of risers or distance blocks 48 upon upper transverse seat-supporting bars 49, which may be of wood, and the rearmost of which ties the rear ends of the middle front boards 37 to the full length lateral boards 36 at a point just forward of the upwardly-projecting friction disk 28, transverse reinforcing metal straps 50 being shown as provided below the seat-supporting bars 49 at the lower side of the resilient platform boards. The forward ends of the rear short middle boards 38 are securely tied to the adjacent long lateral boards 36 by means of an upper bar 51, which may be of wood, and a lower reinforcing metal strap 52 firmly secured together through the platform boards.

It will now be evident from the preceding description that the resilient buckboard platform is mounted upon the comparatively rigid chassis frame in such a way as to fully utilize to the best advantage the resiliency of the platform boards. As the platform boards bend or yield downwardly in the middle from weight carried in the seats 47, the pivots 41 at the front end of the platform provide for the resulting angular movement which takes place, but the rigidity of the supporting arms 40 prevents any free shifting movement longitudinally of this end of the platform or of the platform as a whole. At the rear of the resilient platform the pivoted supporting links 44 provide both for free angular movement due to the downward bending or yielding of the middle part of the platform and also provide for free longitudinal movement of the rear end of the platform to compensate for the shortening of the distance along a straight line between the ends of the platform by reason of its downwardly arched or bent condition. Also it is to be noted that the location of the forward pivots 41 at the lower ends of the rigid supporting arms 40, will cause a rearward movement of the transverse supporting bar 39 from which they rigidly project, and this rearward movement of the bar 39 will have a tendency to compensate for the drawing together of the supporting bars 39 and 42 when the platform bends or yields downwardly at its middle, as will be readily understood. However, as above noted, the pivoted supporting links 44 entirely prevent the possibility of any strain in a longitudinal or endwise direction upon the resilient boards of the buckboard platform, such as, if unprovided for, would objectionably stiffen the platform and also would be very liable to tear the boards loose from their end fastenings.

A clutch pedal 53 projects above the seat-carrying platform at the front and left side thereof and is pivotally supported on the cross-beam 7 and has a short downwardly and forwardly projecting lever arm 53ª which is connected by means of an operating rod or push-rod 54 with the free end of the clutch-operating transverse lever 33, which at its other end is pivotally connected to the side bar 2 of the chassis frame, as hereinbefore described. The arrangement is such that pressure of the foot upon the pedal 53 will force the driving disk 29 into frictional driving engagement with the periphery of the friction wheel 27, as is well understood in the art. The push-rod 54 and connected parts are retracted by a coiled retractile spring 54ª connected to the lever arm 53ª and anchored to the side bar 1 of the chassis frame (Fig. 2).

For changing the ratio of transmission or the relative rate of speed transmitted by the engine 21 through the transmission shaft 29 to the jack-shaft 25 and thence to the driving shaft 16, and also for effecting reversal when desired, the friction wheel 27 is slid or shifted transversely along its shaft 25. The means for thus laterally shifting the friction wheel 27 comprise a transmission-shifting hand lever 55 projecting for a convenient distance above the buckboard platform at its upper end, and at its lower end fixed upon a short transversely extending rock-shaft 56, which is pivoted in bearings carried by the intermediate cross-beam 9 of the chassis frame. At its other end the rock-shaft 56 carries a short upstanding lever arm 57 which is connected by means of an operating rod 58 with one arm of a bell-crank lever 59 pivoted upon a strap shown as extending longitudinally between the rear axle member 4 and the rear cross-beam 10, the other arm of this bell-crank lever 59 being connected in a usual way by means of a pair of short links 60 (one of which appears in Fig. 2) with a sleeve 61 mounted upon a flanged boss 62 which projects from the friction wheel 27, as appears in Fig. 2 of the drawings.

The brake band 35 is operated to grip the brake drum 34 on the driving shaft 16 by means of an upstanding brake pedal 63 fixed upon a rock-shaft 63ª which is pivoted in bearings on the forward cross-beam 7 and upon which is fixed a short upstanding lever arm 64 which is connected by means of an operating rod 65 to the brake band 35, as appears in Fig. 2 of the drawings. The rock-shaft 63ª of the brake pedal 63 also forms a pivotal support for the clutch pedal 53.

A steering wheel 66 is carried at its upper end by an inclined steering rod or steering shaft 67 which is pivoted in an upper bearing bracket 68 and in a lower bearing member 69 both of which in the construction shown in the drawings, are mounted upon and secured to the platform boards, the bearing 69 being shown as located adjacent to the forward end of the platform. The lower end of the steering rod or steering shaft 67 projects below the buckboard platform and is provided with a projecting rearwardly and downwardly inclined operating arm 70 which is connected by means of a steering rod 71 with the steering arm 14 at the right side of the machine, as appears in Figs. 1 and 2 of the drawings.

A fuel tank 72 is shown as mounted upon supporting standards 73 just at the rear of the seats 47. At a convenient distance forward from the seats 47 the buckboard platform is shown as provided with a footboard or footrest 74, shown as located adjacent to the forward end of the platform.

Means are provided to prevent a permanent set or downward bend developing in the resilient boards forming the seat-supporting buckboard platform. At the front of the machine coiled retractile springs 75 are provided, one of which is connected to each of the platform-supporting lever arms 40 and extends therefrom angularly forward and downward and is anchored to one of the side bars 1 and 2, as clearly appears in Figs. 1 and 3 of the drawings. The springs 75 exert a forward pull on the lever arms 40, which, as will be readily understood, will produce a lifting stress at or tend to raise the middle of the resilient buckboard platform, tending to raise or to lift up the seats 47, and this lifting tendency will tend to bend the boards upwardly and will counteract and remove any tendency for these boards to become permanently downwardly bent or set, this counteracting or straightening effect taking place for the most part when the machine is idle and no load in the seats 47, as will be clearly evident. The above described board-straightening effect of the forward springs 75 is reinforced and augmented by rear springs 76 shown as coiled retractile springs attached to the lower ends of the rear lever arms 43 and extending forward alongside of and anchored to the respective side bars 1 and 2 of the chassis frame, as appears most clearly in Figs. 1 and 3 of the drawings. These rear springs 76 tend to rock the lever arm 43 in a counter-clockwise direction as viewed in Fig. 1 and thereby exert a lifting stress or effect at the middle upon the resilient boards of the buckboard platform which tends to remove any permanent downward bend or set therein, similarly in this respect to the forward springs 75.

It is obvious that various modifications may be made in the construction shown in the drawings and above particularly described within the principle and scope of my invention.

I claim:

1. A motor vehicle having, in combination, a comparatively rigid running gear frame extending longitudinally thereof, a superstructure including a bendable resilient platform, and means for supporting said platform upon said frame and for preventing free bodily shifting movement of said platform as a whole relatively to said frame.

2. A motor vehicle having, in combination, a chassis including a comparatively rigid longitudinally extending frame, a longitudinally bendable resilient platform, and means for supporting said platform adjacent to its ends upon the chassis frame and for preventing free longitudinal shifting movement of the platform as a whole.

3. The invention claimed in claim 2 in combination with springs tending to raise the middle of the resilient platform.

4. A motor vehicle having, in combination, a chassis comprising a longitudinally extending frame, front and rear road wheels connected thereby, an engine thereon, and transmission mechanism; and a superstructure comprising a longitudinally bendable resilient platform supported adjacent to its ends upon said chassis frame, supporting means for the ends of said platform adapted to prevent free longitudinal shifting movement of said platform as a whole relatively to said frame, and a seat upon said resilient platform at an intermediate location thereof.

5. The invention claimed in claim 4 in which the supporting means for said platform include means to provide for the longitudinal and angular shifting movement of the ends of the platform due to the resilient bending of such platform.

6. The invention claimed in claim 5 in combination with springs tending to raise the middle of the resilient platform.

7. A motor vehicle having, in combination, a chassis including a frame, a superstructure carried by the chassis frame and including a resilient platform, and means for supporting the resilient platform at its ends upon the chassis frame, such supporting means including lever arms rigidly secured to and extending downward from said resilient platform and pivoted at their lower ends to said chassis frame.

8. A motor vehicle having, in combination, a chassis including a frame, a superstructure carried by the chassis frame and including a longitudinally bendable resilient platform, and means for supporting the resilient platform at its ends upon the chassis frame, said supporting means including means for permitting free bending movement of the resilient platform between its supported ends and for preventing free longitudinal shifting movement of such platform as a whole.

9. The invention claimed in claim 8 in combination with springs tending to raise the middle of the resilient platform.

10. A motor vehicle having, in combination, a chassis including a frame, a superstructure carried by the chassis frame and including a resilient platform, and means for pivotally supporting the ends of the resilient platform upon the chassis frame, said supporting means including means providing for free longitudinal movement of one of the ends of said resilient platform and for preventing free longitudinal movement of the other end of said resilient platform.

11. A motor vehicle having, in combination, a chassis including a frame, a superstructure carried by the chassis frame and including a resilient platform, means for pivotally supporting one end of the resilient platform upon the chassis frame, and means for pivotally supporting and providing for longitudinal movement of the other end of the resilient platform upon and relatively to the chassis frame.

12. The invention claimed in claim 11 in combination with springs tending to raise the middle of the resilient platform.

13. A motor vehicle having, in combination, a chassis including a frame, a superstructure carried by the chassis frame and including a resilient platform, lever arms rigidly secured to one end of the resilient platform and projecting downward and pivoted to the chassis frame for supporting that end of the resilient platform, and supporting links for the other end of the resilient platform, such links being pivoted at one end to the resilient platform and at the other end to the chassis frame so as to provide for both pivotal and longitudinal movement of the adjacent end of the resilient platform.

14. A motor vehicle having, in combination, a chassis including a frame, a superstructure carried by the chassis frame and including a resilient platform, lever arms rigidly secured to an end of the resilient platform and projecting downwardly and pivoted to the chassis frame for supporting that end of the resilient platform, and springs acting between the chassis frame and said lever arms and tending to rock the latter in a direction tending to raise the middle of the resilient platform.

15. A motor vehicle having, in combination, a chassis comprising a frame, a pair of road wheels at the front end thereof, another pair of road wheels at the rear end thereof, an engine mounted upon and projecting above the front end of said frame, and transmission mechanism connecting the engine to at least one of the road wheels; and a superstructure comprising a resilient platform spaced above the chassis frame and extending rearward from a point back of the engine to the rear end of the chassis frame, a seat carried upon the resilient platform intermediate of its ends, supporting arms rigidly secured to the front end of the resilient platform and projecting downward and having a pivotal connection to the chassis frame, and supporting links pivoted to the rear end of the resilient platform and to the rear end of the chassis frame.

16. The invention claimed in claim 15 in combination with springs tending to rock said platform-supporting lever arms in a forward direction relatively to the chassis frame for producing a lifting stress at the middle of the resilient platform.

17. The invention claimed in claim 16 in combination with other springs at the rear end of the resilient platform adapted also to exert a lifting stress at the middle of the resilient platform.

18. A motor vehicle having, in combination, a chassis including a frame, a superstructure carried by the chassis frame and including a resilient platform, a lever arm rigidly secured to and projecting downward from an end of the resilient platform, and a spring tending to rock the lever arm in a direction to raise the middle of the resilient platform.

19. The invention claimed in claim 18 in combination with another lever arm rigidly secured to and projecting downward from the other end of the resilient platform, and a spring tending to rock the latter lever arm in a direction to raise the middle of the resilient platform.

20. A motor vehicle having, in combination, a chassis including a frame, a superstructure carried by the chassis frame and including a resilient platform, lever arms rigidly secured to one end of the resilient platform and projecting downward and pivoted to the chassis frame for supporting that end of the resilient platform, other similar lever arms rigidly secured to the other end of the resilient platform and projecting downward, and supporting links pivoted at one end to the latter lever arms and at the other end to the chassis frame for supporting the adjacent end of the resilient platform and for providing for both pivotal and longitudinal movement of that end of the resilient platform.

21. The invention claimed in claim 20 in combination with springs acting between the chassis frame and said lever arms and tending to rock the latter in a direction for raising the middle of the resilient platform.

22. A motor vehicle having, in combination, a chassis including a frame, a superstructure carried by the chassis frame and including a longitudinally bendable resilient platform, and means for pivotally supporting the ends of the resilient platform upon the chassis frame, said supporting means including means providing for the resilient bending of said platform between its ends and for preventing free longitudinal shifting movement of said platform as a whole relatively to said frame.

23. A motor vehicle having, in combination, a chassis including a frame, a superstructure carried by the chassis frame and including a longitudinally bendable resilient platform, means for pivotally supporting one end of the resilient platform upon the chassis frame and for preventing free longitudinal shifting movement of the platform as a whole relatively to the frame, and supporting links for the other end of the resilient platform, such links being pivoted at one end to the resilient platform and at the other end to the chassis frame so as to provide for both pivotal and longitudinal movement of the adjacent end of the resilient platform.

24. A motor vehicle having, in combination, a chassis including a frame, a superstructure carried by the chassis frame and including a longitudinally bendable resilient platform, means for pivotally supporting one end of the resilient platform upon the chassis frame and for preventing free longitudinal shifting movement of the platform as a whole relatively to the frame, and supporting links for the other end of the resilient platform, such links having upper ends pivoted to the resilient platform and lower ends pivoted to the chassis frame.

25. A motor vehicle having, in combination, a chassis including a frame, a superstructure carried by the chassis frame and including a resilient platform, means for pivotally supporting the front end of the resilient platform upon the chassis frame, said supporting means being adapted to prevent free longitudinal movement of the platform as a whole, and means for pivotally supporting and providing for longitudinal movement of the rear end of the resilient platform upon and relatively to the chassis frame.

26. A motor vehicle having, in combination, a chassis comprising a longitudinally extending frame, front and rear road wheels connected thereby, an engine thereon, and transmission mechanism; and a superstructure comprising a resilient platform, means for pivotally supporting the front end of the resilient platform upon the chassis frame, supporting links for the rear end of the resilient platform, such links being pivoted at one end to the resilient platform and at the other end to the chassis frame so as to provide for both pivotal and longitudinal movement of the adjacent end of the resilient platform, and a seat upon the resilient platform at an intermediate location thereof.

27. A motor vehicle having, in combination, a chassis comprising a longitudinally extending frame, front and rear road wheels connected thereby, an engine thereon, and transmission mechanism; and a superstructure comprising a resilient platform, means for pivotally supporting one end of the resilient platform upon the chassis frame and for preventing free longitudinal shifting movement of such platform, supporting links for the other end of the resilient platform, such links having upper ends pivoted to the resilient platform and lower ends pivoted to the chassis frame so as to provide for both pivotal and longitudinal movement of the adjacent end of the resilient platform, and a seat upon the resilient platform at an intermediate location thereof.

28. A motor vehicle having, in combination, a chassis comprising a comparatively rigid longitudinally extending frame, front and rear road wheels connected by the frame, an engine carried by the frame, transmission mechanism on the frame for connecting the engine to at least one of the road wheels, and brake mechanism on the chassis; and a superstructure comprising a longitudinally bendable resilient platform supported adjacent to its ends on the frame of the chassis, supporting means for the ends of said platform adapted to prevent longitudinal shifting movement of said platform as a whole relatively to said frame, and a seat upon the resilient platform at an intermediate location thereof.

29. A motor vehicle having, in combination, a chassis comprising a frame, a pair of road wheels at the front end thereof, another pair of road wheels at the rear end thereof, an engine mounted upon and projecting above the front end of said frame, and transmission mechanism connecting the engine to at least one of the road wheels; and a superstructure comprising a resilient platform spaced above the chassis frame and extending rearward from a point back of the engine to the rear end of the chassis frame, means for pivotally supporting the front end of the resilient platform upon the chassis frame, supporting links pivoted to the rear end of the resilient platform and to the rear end of the chassis frame, and a seat carried upon the resilient platform intermediate of its ends.

In testimony whereof I have affixed my signature.

ALBERT B. NORWALK.

Copies of this patent may be obtained for five cents each, by addressing the "Commissioner of Patents, Washington, D. C."